(12) United States Patent
Kim et al.

(10) Patent No.: US 10,120,113 B2
(45) Date of Patent: Nov. 6, 2018

(54) POLARIZING PLATE AND IMAGE DISPLAY DEVICE COMPRISING THE SAME

(71) Applicant: DONGWOO FINE-CHEM CO., LTD., Iksan-si, Jeollabuk-do (KR)

(72) Inventors: Eunyoung Kim, Pyeongtaek-si (KR); Yong Won Seo, Hwaseong-si (KR); Kwanwook Song, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 15/680,636

(22) Filed: Aug. 18, 2017

(65) Prior Publication Data

US 2018/0059300 A1 Mar. 1, 2018

(30) Foreign Application Priority Data

Aug. 23, 2016 (KR) .................. 10-2016-0106745

(51) Int. Cl.
*G02B 5/30* (2006.01)
*G02B 1/14* (2015.01)

(52) U.S. Cl.
CPC .............. *G02B 5/3016* (2013.01); *G02B 1/14* (2015.01); *G02B 5/3033* (2013.01); *G02B 5/3083* (2013.01)

(58) Field of Classification Search
CPC ...... G02B 1/14; G02B 5/3016; G02B 5/3033; G02B 5/3083
USPC ........................................ 359/487.02, 489.07
See application file for complete search history.

(56) References Cited

U.S. PATENT DOCUMENTS

| 7,443,585 | B2* | 10/2008 | Hara | G02B 5/3016 349/18 |
| 2006/0127606 | A1* | 6/2006 | Ogasawara | G02B 5/3083 428/1.3 |
| 2007/0166537 | A1* | 7/2007 | Nagamoto | B32B 37/12 428/355 AC |
| 2007/0267133 | A1* | 11/2007 | Matano | C09J 7/20 156/272.2 |
| 2015/0070764 | A1* | 3/2015 | Hatanaka | B32B 27/00 359/489.07 |
| 2015/0323703 | A1* | 11/2015 | Kaneko | G02F 1/13363 349/96 |
| 2016/0154157 | A1* | 6/2016 | Cho | G02B 1/11 359/489.07 |

FOREIGN PATENT DOCUMENTS

KR 10-2014-0030060 A 3/2014

* cited by examiner

*Primary Examiner* — Ricky D Shafer
(74) *Attorney, Agent, or Firm* — Sughrue Mion, PLLC

(57) ABSTRACT

The present invention provides a polarizing plate comprising a substrate, a polarizing coating layer formed on one side of the substrate, a first adhesive layer formed on the polarizing coating layer, a first retardation coating layer formed on the first adhesive layer, a second adhesive layer formed on the first retardation coating layer, a second retardation coating layer formed on the second adhesive layer, and a soft layer formed on the second retardation coating layer, wherein, the soft layer has an amended toughness of 1,000 to 40,000 MPa·%. The polarizing plate according to the present invention has excellent bending resistance and thus can be effectively used for a flexible display.

17 Claims, 2 Drawing Sheets

FIG. 1

| | |
|---|---|
| substrate | ~110 |
| polarizing coating layer | ~120 |
| polarizing coating protective layer | ~121 |
| first adhesive layer | ~125 |
| first retardation coating layer | ~130 |
| second adhesive layer | ~135 |
| second retardation coating layer | ~140 |
| soft layer | ~150 | polarizing plate (100)

POLARIZING PLATE AND IMAGE DISPLAY DEVICE COMPRISING THE SAME

CROSS REFERENCE TO RELATED APPLICATIONS

This application claims priority based on Korean Patent Application No. 10-2016-0106745, filed Aug. 23, 2016, the content of which is incorporated herein by reference in its entirety.

TECHNICAL FIELD

The present invention relates to a polarizing plate and an image display device comprising the same. More specifically, the present invention relates to a polarizing plate having a thin film structure with reduced weight and excellent bending resistance, and an image display device comprising the same.

BACKGROUND ART

A polarizing plate used for a liquid crystal display or the like generally includes a polarizer (also referred to as a 'polarizing film') in which an iodine-based compound or a dichroic polarizing material is adsorbed and aligned to a polyvinyl alcohol (PVA)-based resin film, arranged in a predetermined direction, and a first and a second polarizer protective films, typically known as triacetylcellulose (TAG) films, are each laminated on both sides of the polarizer via an adhesive.

In recent years, a market for slimmed image display devices, such as slim-type large wall-mounted TV's, mobile-type computers, mobile phones and the like, has been rapidly expanding. In addition, recently, a flexible display device which can maintain display performance even when it is bent like a paper by using a flexible material such as plastic, instead of a conventional glass substrate having no flexibility, gains attention as a next generation display device. Accordingly, there is a need for a polarizing plate, thin in thickness, light in weight and having folding characteristics.

Korean Patent Laid-Open Publication No. 2014-0030060 discloses a circular polarizing plate including a substrate, a retardation layer and a polarizing layer, wherein both the retardation layer and the polarizing layer are coating layers, the total thickness of the retardation layer and the polarizing layer is 10 μm or less, and the polarizing plate contains a dichroic dye. Although the above circular polarizing plate had a sufficient performance as a broadband circular polarizing plate and its thickness satisfied the slimness of a display device, it had an insufficient folding characteristic required for a flexible display, which was problematic.

Accordingly, the development of a polarizing plate having excellent bending resistance which can be applied to a flexible display has been desperately demanded.

DISCLOSURE

Technical Problem

It is one object of the present invention to provide a polarizing plate having a thin film structure with reduced weight and excellent bending resistance.

It is another object of the present invention to provide an image display device comprising the polarizing plate.

Technical Solution

In accordance with one aspect of the present invention, there is provided a polarizing plate comprising a substrate, a polarizing coating layer formed on one side of the substrate, a first adhesive layer formed on the polarizing coating layer, a first retardation coating layer formed on the first adhesive layer, a second adhesive layer formed on the first retardation coating layer, a second retardation coating layer formed on the second adhesive layer, and a soft layer formed on the second retardation coating layer, wherein the soft layer has an amended toughness defined by the following Equation 1 of 1,000 to 40,000 MPa·%:

$$\text{Amended toughness} = \text{Maximum stress} \times \text{Maximum strain} \quad \text{[Equation 1]}$$

wherein, the maximum stress represents the stress at the fracture point in the stress-strain curve, and the maximum strain represents the strain at the fracture point in the stress-strain curve.

In one embodiment of the present invention, the soft layer may be a coating layer or a substrate film.

In another embodiment of the present invention, there is provided an image display device comprising the polarizing plate.

Advantageous Effects

The polarizing plate according to the present invention includes a soft layer having an amended toughness of 1,000 to 40,000 MPa·% on a retardation coating layer, and thus has excellent bending resistance. Therefore, the polarizing plate according to the present invention can be effectively used for a flexible display.

BRIEF DESCRIPTION OF DRAWINGS

FIG. 1 is a cross-sectional diagram schematically illustrating the polarizing plate according to one embodiment of the present invention.

DETAILED DESCRIPTION OF THE EMBODIMENTS

Figure 2:
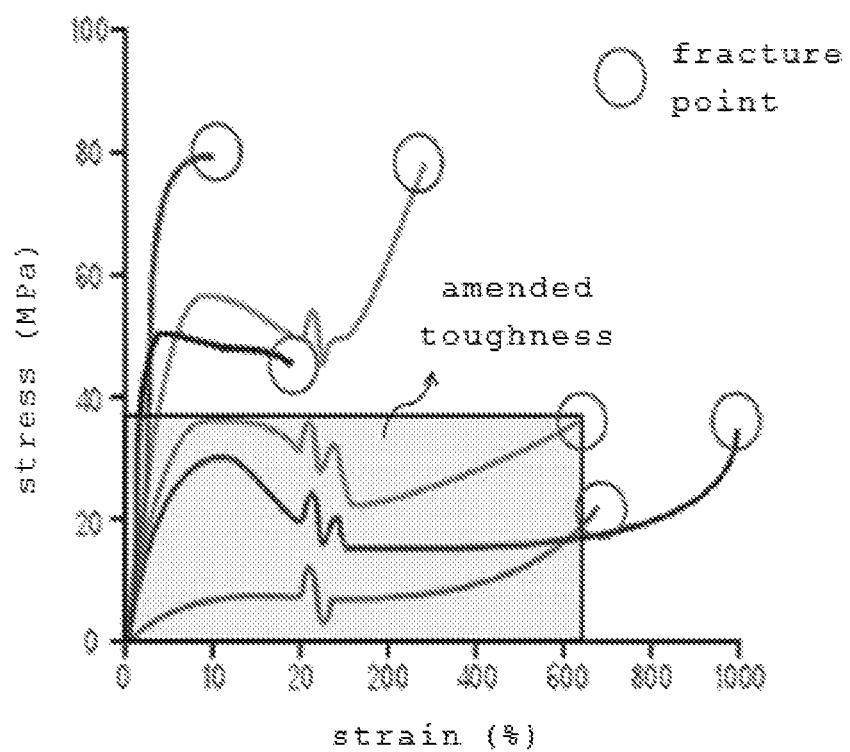
FIG. 2 is a diagram schematically illustrating stress-strain curves of films made of polymers.

Hereinafter, the present invention will be described in more detail with reference to the accompanying drawings.

As shown in FIG. 1, the polarizing plate 100 according to one embodiment of the present invention includes a substrate 110, a polarizing coating layer 120 formed on one side of the substrate, a first adhesive layer 125 formed on the polarizing coating layer, a first retardation coating layer 130 formed on the first adhesive layer 125, a second adhesive layer 135 formed on the first retardation coating layer 130, a second retardation coating layer 140 formed on the second adhesive layer 135, and a soft layer 150 formed on the second retardation coating layer 140, wherein the soft layer has an amended toughness defined by the following Equation 1 of 1,000 to 40,000 MPa·%:

$$\text{Amended toughness} = \text{Maximum stress} \times \text{Maximum strain} \quad \text{[Equation 1]}$$

wherein, the maximum stress represents the stress at the fracture point in the stress-strain curve, and the maximum strain represents the strain at the fracture point in the stress-strain curve.

The stress-strain curve can be used interchangeably with terms such as a stress-strain graph, a stress-strain diagram and the like. The stress-strain curve can be obtained by measuring the load and strain applied to the specimen of a material. For example, it can be measured and derived using a universal testing machine (UTM) according to ASTM D 882.

FIG. 2 illustrates the stress-strain curves of various polymer films, and the circle marked at the end of each curve corresponds to a fracture point. The amended toughness of Equation 1 is defined by multiplication of x value (maximum strain) and y value (maximum stress) at the fracture point. In FIG. 2, the amended toughness of any one of the various polymer films is indicated with a box.

The polarizing plate 100 according to one embodiment of the present invention includes a soft layer having an amended toughness of 1,000 to 40,000 MPa·%, thereby securing a folding characteristic required for a flexible display. If the amended toughness is less than 1,000 MPa·%, the effect of improving the bending resistance may be insignificant. Meanwhile, as the amended toughness increases, the effect of improving the bending resistance is superior, and thus, the upper limit is not particularly limited, but it may be 40,000 MPa·% or less, preferably 35,000 MPa·% or less for economic reasons.

The polarizing plate according to one embodiment of the present invention may have a thickness of 30 to 200 μm, preferably 40 to 130 μm.

<Substrate>

In one embodiment of the present invention, as the substrate, a film having excellent transparency, mechanical strength, thermal stability, moisture barrier property, isotropy and the like can be used. Specific examples thereof include a film composed of thermoplastic resins such as polyester-based resins such as polyethylene terephthalate, polyethylene isophthalate, polyethylene naphthalate, polybutylene terephthalate and the like; cellulose-based resins such as diacetyl cellulose, triacetyl cellulose and the like; polycarbonate-based resins; acryl-based resins such as polymethyl (meth)acrylate, polyethyl (meth)acrylate and the like; styrene-based resins such as polystyrene, acrylonitrile-styrene copolymer and the like; polyolefin-based resins such as polyethylene, polypropylene, polyolefin having cyclo-based or norbornene structure, ethylene-propylene copolymer and the like; vinyl chloride-based resins; amide-based resins such as nylon, aromatic polyamide and the like; imide-based resins; polyethersulfone-based resins; polyetheretherketone-based resins; polyphenylene sulfide-based resins; vinyl alcohol-based resins; vinylidene chloride-based resins; vinyl butyral-based resins; allylate-based resins; polyoxymethylene-based resins; epoxy-based resin and the like. A film composed of the blend of the thermoplastic resin may also be used. In addition, a film composed of (meth)acryl-based, urethane-based, acryl urethane-based, epoxy-based or silicone-based thermal curable resins, or ultraviolet curable resins may be used.

The thickness of the substrate may be 10 to 200 μm, preferably 20 to 100 μm.

<Polarizing Coating Layer>

In one embodiment of the present invention, the polarizing coating layer serves as an optical film which functions to convert incident natural light into a desired single polarization state (linear polarization state), that is, it serves as a polarizer, and may be formed on at least one side of the substrate.

For example, the polarizing coating layer can be prepared by forming an alignment film layer by coating a composition for forming an alignment film onto a substrate to impart an alignment property, and then forming a liquid crystal coating layer by coating a composition for forming a coating layer including a liquid crystal compound and a dichroic dye onto the alignment film layer.

Such a polarizing coating layer can be formed to have a small thickness compared to a conventional polarizing plate, that is, a polarizing plate including a polyvinyl alcohol-based polarizer and a protective film adhered to both sides of the polarizer through an adhesive.

The composition for forming an alignment layer may include an aligning agent, a photopolymerization initiator and a solvent commonly used in the art.

As the aligning agent, any aligning agent commonly used in the art can be used without particular limitation. For example, a polyacrylate-based polymer, a polyamic acid, a polyimide-based polymer, or a polymer containing a cinnamate group can be used as an aligning agent, and in the application of photoalignment, a polymer containing a cinnamate group is preferably used. The polymer used as the aligning agent may have a weight average molecular weight of about 10,000 to 500,000, but is not limited thereto.

As the photopolymerization initiator, any photopolymerization initiator commonly used in the art can be used without particular limitation. For example, benzoin compounds, benzophenone compounds, alkylphenone compounds, acylphosphine oxide compounds, triazine compounds, iodonium salts and sulfonium salts may be used. Commercially available products can also be used as the photopolymerization initiator. Specifically, examples may include Irgacure 907, Irgacure 184, Irgacure 651, Irgacure 819, Irgacure 250, Irgacure 369 (available from BASF Japan Ltd.), Seikuol BZ, Seikuol Z, Seikuol BEE (available from Seiko Chemical), Kayacure BP100 (available from Nippon Kayaku), Cyracure UVI-6992 (available from Dow Chemical), Adeka optomer SP-152, Adeka optomer SP-170 (available from ADEKA), TAZ-A, TAZ-PP (available from DKSH Japan), TAZ-104 (available from Sanwa Chemical) and the like.

As the solvent, any solvent commonly used in the art may be used without particular limitation. For example, alcohol solvents such as methanol, ethanol, ethylene glycol, isopropyl alcohol, propylene glycol, ethylene glycol methyl ether, ethylene glycol butyl ether, propylene glycol monomethyl ether, phenol and the like; ester solvents such as ethyl acetate, butyl acetate, ethylene glycol methyl ether acetate, γ-butyrolactone, propylene glycol methyl ether acetate, ethyl lactate and the like; ketone solvents such as acetone, methyl ethyl ketone, cyclopentanone, cyclohexanone, 2-heptanone, methyl isobutyl ketone and the like; aliphatic hydrocarbon solvents such as pentane, hexane, heptane and the like; aromatic hydrocarbon solvents such as toluene, xylene and the like; nitrile solvents such as acetonitrile and the like; ether solvents such as tetrahydrofuran, dimethoxyethane and the like; and chlorine-based solvents such as chloroform, chlorobenzene and the like may be included. These solvents may be used alone or in combination of two or more.

The composition for forming an alignment film may further include additives such as fillers, curing agents, leveling agents, adhesion promoters, antioxidants, ultraviolet absorbers, flocculation inhibitors, chain transfer agents, or the like, if necessary.

As the composition for forming an alignment film, a commercially available product may be used, and specific example thereof includes ROP-108 EXP115 commercially available from Rolic.

For the application of the composition for forming an alignment film, any coating method commonly known in the art, for example, a doctor blade, a wire bar, a die coater, a comma coater, a gravure coater, a roll or the like may be used without limitation.

After coating the composition for forming an alignment film on a substrate, a drying process may be performed. In this case, the drying may be performed at 120° C. or lower, preferably at 30 to 120° C., more preferably at 50 to 120° C., but is not limited thereto.

After the composition for forming an alignment film is coated and, if necessary, dried, an alignment treatment is performed. The alignment treatment may be carried out by various methods known in the art without limitation, and preferably, photo-curing can be used.

The composition for forming a coating layer has optical anisotropy, and may include a liquid crystal compound having a cross-linking property caused by light or heat and a dichroic dye.

The liquid crystal compound may include, for example, a reactive liquid crystal compound (RM). Examples of the reactive liquid crystal compound (RM) include those described in Information Display Vol. 10, No. 1 (Recent Research Trend of Reactive Liquid Crystal Monomer (RM)).

The reactive liquid crystal compound refers to a monomer molecule having a liquid crystal phase by including a mesogen capable of exhibiting liquid crystallinity and a terminal group capable of polymerization. When the reactive liquid crystal compound is polymerized, it becomes possible to obtain a crosslinked polymer network while maintaining the aligned phase of the liquid crystal. When the reactive liquid crystal compound molecule is cooled from a clearing point, a domain with a large area having a well-aligned structure can be obtained at a relatively low viscosity in a liquid crystal phase, compared to using a liquid crystal polymer of the same structure.

The thus-formed crosslinked network film in a liquid crystal phase with a large area is in the form of a solid thin film while maintaining the properties of a liquid crystal, such as optical anisotropy or dielectric constant, and thus is mechanically and thermally stable.

A commercially available product may be used as the reactive liquid crystal compound, and specific examples thereof include paliocolor LC242 commercially available from BASF Corporation. These reactive liquid crystal compounds may be used alone or in combination of two or more.

The dichroic dye refers to a dye which absorbs one light of two polarizing quadrature components and transmits the other polarizing quadrature component, in a given wavelength region. That is, the dichroic dye has a characteristic of linearly polarizing the light. Examples of such a dichroic dye include anthraquinone dyes, phthalocyanine dyes, porphyrin azo dyes, bi-azo dyes, and triazo dyes. In particular, dichroic azo dyes are suitable.

When the reactive liquid crystal compound is polymerized, the dichroic dye is dispersed among liquid crystals and aligned in the same direction as the liquid crystals.

The composition for forming a coating layer is used by being diluted in a solvent in order to ensure the efficiency of the coating process and uniformity of the coating layer, and preferably, it is dissolved in a solvent capable of dissolving the liquid crystal compound to have uniformity.

In addition, the reactive liquid crystal compound includes an initiator for polymerization and crosslinking thereof to prepare a composition for forming a coating layer. A known photopolymerization initiator or a thermal polymerization initiator can be used as the initiator, and the photopolymerization initiator is preferable considering the reaction time and control. The initiator may be used in an amount of 10% by weight or less, preferably 0.1 to 6% by weight, based on the total solid content of the reactive liquid crystal compound.

Further, the reactive liquid crystal compound may further include additives to prepare a composition for forming a coating layer. As the additives, for example, photosensitizers, dispersants, binders (e.g., free radical polymerizable and cationic polymerizable binding component), preservatives (e.g., glutaraldehyde, tetramethylol acetyleneurea), silane coupling agents, leveling agents, crosslinking agents, antioxidants, degassing agents, antifoaming agents, viscosity adjusting agents, flow improvers, anti-settling agents, gloss improvers, lubricants, adhesion promoters, matting agents, emulsifiers, stabilizers, hydrophobic agents, ultraviolet absorbers, treatment improver, antistatic agents or the like may be used.

The method of coating the composition for forming a coating layer is not particularly limited, but specifically, a die coating, a pin coating, a roll coating, a dispensing coating, a gravure coating and the like may be used. It is preferable to determine the type and amount of the solvent depending on the coating method.

The solvent contained in the composition for forming a coating layer is evaporated through a drying process.

The drying is not particularly limited, and can be performed using a common hot air dryer or a far infrared ray heater. The drying temperature is usually 50 to 150° C., preferably 70 to 130° C., and the drying time is usually 30 to 600 seconds, preferably 60 to 300 seconds. Further, the drying can be carried out under the same temperature condition or while raising the temperature stepwise.

After drying, the liquid crystal coating layer is formed by photocuring via light irradiation such as ultraviolet rays, or heat curing via heat irradiation such as a heater.

The photocuring can be performed by using a low-pressure mercury lamp, a medium-pressure mercury lamp, a high-pressure mercury lamp, an ultrahigh-pressure mercury lamp, a chemical lamp, a black light lamp, a microwave excited mercury lamp, a metal halide lamp and the like. Considering the economic efficiency and the output of the lamp, it is preferable to use the high-pressure mercury lamp and metal halide lamp.

The illuminance may be in the range of 10 to 5000 $mJ/cm^2$, preferably in the range of 30 to 3000 $mJ/cm^2$, more preferably in the range of 50 to 2000 $mJ/cm^2$. If the illuminance is less than 10 $mJ/cm^2$, the curing time may be prolonged, thereby deteriorating the productivity. If the illuminance exceeds 5000 $mJ/cm^2$, a thermal damage may be applied to the film due to high illuminance, thereby deforming the film.

The thickness of the polarizing coating layer may be 0.5 to 10 μm, preferably 2 to 4 μm.

<Retardation Coating Layer>

In one embodiment of the present invention, the retardation coating layer collectively includes λ/2 layer, λ/4 layer, positive C and the like.

The retardation coating layer can be prepared by forming an alignment film layer by coating a composition for forming an alignment film onto a transfer film to impart an alignment property, and forming a liquid crystal coating layer by coating a (composition for forming a coating layer including a liquid crystal compound onto the alignment film layer, followed by adhering it to an adhesive layer and then removing the transfer film, but is not limited thereto.

As the transfer film, the polymer film exemplified as the substrate above can be used.

The composition for forming an alignment film and the method for coating and drying the same, etc. are the same as those described for the polarizing coating layer, and thus the description thereof is omitted to avoid duplication.

The composition of the composition for forming a coating layer is the same as that described for the polarizing coating layer, except that it does not include a dichroic dye. In addition, since the method of coating, drying and curing the composition for forming a coating layer is the same as that described for the polarizing coating layer, the description thereof is omitted to avoid duplication.

The thickness of the retardation coating layer may be 0.5 to 10 μm, preferably 1 to 4 μm.

In one embodiment of the present invention, the retardation coating layer can adjust optical characteristics depending on the thickness of the coating layer, the alignment state of the polymerizable liquid crystal compound, and the like.

Specifically, by adjusting the thickness of the retardation layer, a retardation layer providing a desired in-plane retardation can be prepared. The in-plane retardation value (Re($\lambda$)) of the resulting retardation layer is determined according to the following Equation 2. In order to obtain a desired Re($\lambda$), it is necessary to adjust $\Delta n(\lambda)$ and the film thickness (d).

$$Re(\lambda) = d \times \Delta n(\lambda) \quad \text{[Equation 2]}$$

wherein,

Re($\lambda$) represents an in-plane retardation value at a wavelength of $\lambda$ nm, d represents a film thickness, and $\Delta n(\lambda)$ represents a birefringence index at a wavelength of $\lambda$ nm.

Considering the refractive index ellipsoid formed by the alignment of the polymerizable liquid crystal compound, the refractive indices of three directions, i.e. nx, ny and nz, are defined as follows. nx represents the main refractive index in the direction parallel to the substrate plane in the refractive index ellipsoid formed by the retardation layer. ny represents a refractive index in the direction which is parallel to the substrate plane in the refractive index ellipsoid formed by the retardation layer, and orthogonal to the direction of nx. nz represents a refractive index in the direction perpendicular to the substrate plane in the refractive index ellipsoid formed by the retardation layer.

When the retardation layer is a $\lambda/4$ layer, the in-plane retardation value Re(550) is in the range of 113 to 163 nm, preferably in the range of 130 to 150 nm. When the retardation layer is a $\lambda/2$ layer, Re (550) is in the range of 250 to 300 nm, preferably in the range of 265 to 285 nm.

In addition, depending on the alignment state of the polymerizable liquid crystal compound, the retardation layer expressing a retardation in the thickness direction can be prepared. The expression of the retardation in the thickness direction indicates a characteristic that the retardation value Rth in the thickness direction becomes a negative in the following Equation 3.

$$Rth = [(nx+ny)/2 - nz] \times d \quad \text{[Equation 3]}$$

wherein, nx, ny, nz and d are as defined above.

The in-plane retardation value Re (550) of the positive C layer is usually in the range of 0 to 10 nm, preferably in the range of 0 to 5 nm, and the retardation value Rth in the thickness direction is usually in the range of −10 to −300 nm, preferably in the range of −20 to −200 nm.

In one embodiment of the present invention, the first retardation coating layer may be a $\lambda/4$ layer for preparing circular polarization, and the second retardation coating layer may be a positive C layer for improving color sense in oblique direction.

In another embodiment of the present invention, the first retardation coating layer may be a positive C layer for improving the color sense in the oblique direction, and the second retardation coating layer may be a $\lambda/4$ layer for preparing circular polarization.

<Adhesive Layer>

In one embodiment of the present invention, the adhesive layer is interposed between the polarizing or between the first retardation coating layer and the second retardation coating layer to play a role in adhering them to each other, and may be formed by a pressure sensitive adhesive or an adhesive.

As the pressure sensitive adhesive, an acryl-based pressure sensitive adhesive including an acryl-based copolymer and a crosslinking agent may be used.

The acryl-based copolymer can be prepared by radical polymerization of a (meth)acrylate monomer having an alkyl group of 1 to 12 carbon atoms and a polymerizable monomer having a crosslinkable functional group.

The (meth)acrylate refers to acrylate and methacrylate.

Specific examples of the (meth)acrylate monomer having an alkyl group of 1 to 12 carbon atoms include n-butyl (meth)acrylate, 2-butyl (meth)acrylate, t-butyl (meth)acrylate, 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, nonyl (meth)acrylate, decyl (meth)acrylate, lauryl (meth)acrylate, and the like. Among them, n-butyl acrylate, methyl acrylate or the combination thereof is preferable. They can be used alone or in combination of two or more.

The polymerizable monomer having a crosslinkable functional group is a component for imparting durability and cutability by reinforcing the cohesive force or adhesive force of the pressure sensitive adhesive by a chemical bonding with the following crosslinking agent. For example, a monomer having a hydroxyl group, a monomer having a carboxyl group, a monomer having an amide group, a monomer having a tertiary amine group, and the like may be exemplified, and they can be used alone or in combination of two or more.

Examples of the monomer having a hydroxyl group include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 2-hydroxyethylene glycol (meth)acrylate, 2-hydroxypropylene glycol (meth)acrylate, hydroxyalkylene glycol (meth)acrylate having an alkylene group of 2 to 4 carbon atoms, 4-hydroxybutyl vinyl ether, 5-hydroxypentyl vinyl ether, 6-hydroxyhexyl vinyl ether, 7-hydroxyheptyl vinyl ether, 8-hydroxyoctyl vinyl ether, 9-hydroxynonyl vinyl ether, 10-hydroxydecyl vinyl ether, and the like. Among these, 2-hydroxyethyl (meth)acrylate or 4-hydroxybutyl vinyl ether may be preferable.

Examples of the monomer having a carboxyl group include a monovalent acid such as (meth)acrylic acid, crotonic acid and the like; a divalent acid such as maleic acid, itaconic acid, fumaric acid, and an monoalkyl ester thereof; 3-(meth)acryloyl propionic acid; a succinic anhydride ring-opening adduct of 2-hydroxyalkyl (meth)acrylate having an alkyl group of 2 to 3 carbon atoms, a succinic anhydride ring-opening adduct of hydroxyalkylene glycol (meth)acrylate having an alkylene group of 2 to 4 carbon atoms, a compound obtained by a ring-opening addition of succinic anhydride to a caprolactone adduct of 2-hydroxyalkyl (meth)acrylate having an alkyl group of 2 to 3 carbons, and the like. Among them, (meth)acrylic acid may be preferable.

Examples of the monomer having an amide group include (meth)acrylamide, N-isopropylacrylamide, N-tert-butylacrylamide, 3-hydroxypropyl (meth)acrylamide, 4-hydroxybutyl (meth)acrylamide, 6-hydroxyhexyl (meth)acrylamide, 8-hydroxyoctyl (meth)acrylamide, 2-hydroxyethylhexyl (meth)acrylamide, and the like. Among them, (meth)acrylamide may be preferable.

Examples of the monomer having a tertiary amine group include N,N-(dimethylamino)ethyl (meth)acrylate, N,N-(diethylamino) ethyl (meth)acrylate, N,N-(dimethylamino)propyl (meth)acrylate, and the like.

The polymerizable monomer having a crosslinkable functional group is preferably contained in an amount of 0.05 to 10 parts by weight, more preferably 0.1 to 8 parts by weight, based on 100 parts by weight of the (meth)acrylate monomer having an alkyl group of 1 to 12 carbon, atoms. If the content is less than 0.05 part, by weight, the cohesive force of the pressure sensitive adhesive decreases, thereby decreasing durability. If the content exceeds 10 parts by weight, the adhesive force decreases due to a high gel fraction and problems in durability may be caused.

The acryl-based copolymer may further contain, in addition to the above-mentioned monomers, other polymerizable monomers within a range that does not deteriorate the adhesive force, for example, in an amount of 10% by weight or less based on the total amount.

The method for preparing the acryl-based copolymer is not particularly limited, and it can be prepared by methods, which are commonly used in the art, such as bulk polymerization, solution polymerization, emulsion polymerization or suspension polymerization, and solution polymerization is preferable. Further, a solvent, a polymerization initiator, a chain transfer agent for molecular weight control and the like, which are commonly used in polymerization, can be used.

The acryl-based copolymer commonly has a weight average molecular weight (in terms of polystyrene) measured by gel permeation chromatography (GPC) of 50,000 to 2,000,000, preferably 500,000 to 2,000,000.

The crosslinking agent is a component for reinforcing the cohesive force of the pressure sensitive adhesive by properly crosslinking the copolymer, and the type thereof is not particularly limited. Examples thereof include an isocyanate-based compound, an epoxy-based compound, and the like, and they may be used alone or in combination of two or more.

Examples of the isocyanate-based compound include diisocyanate compounds such as tolylene diisocyanate, xylene diisocyanate, 2,4-diphenylmethane diisocyanate, 4,4-diphenylmethane diisocyanate, hexamethylene diisocyanate, isophorone diisocyanate, tetramethylxylene diisocyanate, naphthalene diisocyanate, and the like; an adduct obtained by reacting 1 mole of polyhydric alcohol-based compound, such as trimethylolpropane, with 3 moles of diisocyanate compound, an isocyanurate compound obtained by self-condensing 3 moles of diisocyanate compound, a biuret obtained by condensing diisocyanate urea obtained from 2 moles of 3 moles of diisocyanate compound with the remaining one mole of diisocyanate, a polyfunctional isocyanate compound containing three functional groups such as triphenylmethane triisocyanate, methylenebis triisocyanate and the like.

Examples of the epoxy-based compound include ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether, polyglycerol polyglycidyl ether, resorcin diglycidyl ether, 2,2-dibromoneopentyl glycol diglycidyl ether, trimethylolpropane triglycidyl ether, pentaerythritol polyglycidyl ether, sorbitol polyglycidyl ether, adipic acid diglycidyl ester, phthalic acid diglycidyl ester, tris(glycidyl) isocyanurate, tris(glycidoxyethyl) isocyanurate, 1,3-bis(N,N-glycidylaminomethyl) cyclohexane, N,N,N',N'-tetraglycidyl-m-xylenediamine, and the like.

Further, a melamine-based compound may be used alone or in combination with two or more, with the isocyanate-based compounds and the epoxy-based compounds.

Examples of the melamine-based compound include hexamethylol melamine, hexamethoxymethyl melamine, hexabutoxymethyl melamine, and the like.

The crosslinking agent is preferably contained in an amount of 0.1 to 5 parts by weight, more preferably 0.1 to 2 parts by weight, based on 100 parts by weight of the acryl-based copolymer. If the content is less than 0.1 part by weight, the cohesive force decreases due to insufficient degree of crosslinking, resulting in deterioration of durability, such as loosening, and deterioration of cutability. If the content exceeds 5 parts by weight, excessive crosslinking may cause a problem in relaxation of residual stress.

Each component constituting the pressure sensitive adhesive is dissolved in a suitable solvent, such as ethyl acetate, to obtain a composition for a pressure sensitive adhesive, and the relevant composition for a pressure sensitive adhesive is coated onto the substrate and then dried to form an adhesive layer. In some cases, when there are components which are undissolved in the solvent, they may be dispersed in the solvent.

Examples of the adhesive include a water-based adhesive, in which an adhesive component is dissolved or dispersed in water, and an active energy ray-curable adhesive, which cures upon irradiation with active energy rays.

Examples of the water-based adhesive include a composition including a polyvinyl alcohol-based resin or a urethane resin as a main component, and a crosslinking agent, such as an isocyanate-based compound or an epoxy compound, or a curable compound for improving the adhesiveness, and the like, When the polarizing coating layer and the retardation coating layer, or the retardation coating layers are adhered via the water-based adhesive, the water-based adhesive is injected between the two coating layers, and then sufficient adhesiveness can be imparted to both layers by carrying out a thermal crosslinking reaction, while evaporating water by the above-mentioned drying method.

Examples of the active energy ray-curable adhesive include a cation polymerizable active energy ray-curable adhesive including an epoxy compound and a cation polymerization initiator, a radical polymerizable active energy ray-curable adhesive including an acryl-based curing component and a radical polymerization initiator, an active energy ray-curable adhesive which includes both a cation polymerizable curable component, such as an epoxy compound, and a radical polymerizable curable component, such as an acryl-based compound, and which further includes a cation polymerization initiator and a radical polymerization initiator, and an electron beam-curable active energy ray-curable adhesive which performs curing by irradiating an electron beam, etc. The electron beam-curable active energy ray-curable adhesive does not include an initiator.

Among them, the cation polymerizable active energy ray-curable adhesive including an epoxy compound and a cation polymerization initiator is preferable. It is preferable that the active energy ray-curable adhesive does not substantially include a solvent.

The active energy ray-curable adhesive is coated onto the substrate and then cured by irradiating an active energy ray to form an adhesive layer.

In one embodiment of the present invention, the method of forming the adhesive layer may comprise a method of coating a pressure sensitive adhesive or an adhesive onto a substrate or a layer formed on a substrate using a release film as the substrate, and transferring the resulting adhesive layer (hereinafter, referred to as "transfer adhesive layer") to the surface of an adherend, a method of forming an adhesive layer by directly coating a pressure sensitive adhesive or an adhesive on the surface of an adherend, and the like. Further, after forming an adhesive layer on one release film or a layer formed, on the release film, another release film may be further bonded on the adhesive layer to form a double-sided separator type sheet. The double-sided separator type sheet peels off the release film on one side when necessary and is bonded to the adherend. Examples of commercially available double-sided separator type sheets may include a noncarrier pressure sensitive adhesive film or a noncarrier adhesive sheet available from Lintec Kabushiki Kaisha or Nitto Denko Kabushiki Kaisha.

Examples of the release film may include those in polyethylene terephthalate, polybutylene terephthalate, polycarbonate, polyallylate, polypropylene, polyethylene or the like is used as a substrate, and release treatment such as silicon treatment and the like are performed on the bonding surface with the adhesive layer of the substrate. The release film is also referred to as a separate film or a separator.

The thickness of the adhesive layer may be adjusted according to the adhesive force, and may be 0.1 to 10 μm, preferably 2 to 5 μm.

In one embodiment of the present invention, the first adhesive layer and the second adhesive layer may be made of the same material or different materials, and may have the same thickness or different thicknesses.

<Soft Layer>

In one embodiment of the present invention, the soft layer, which is a protective layer of the retardation coating layer, may be a coating layer or a substrate film.

The material of the coating layer or the substrate film is not particularly limited as long as the soft layer satisfies the condition that the amended toughness defined by Equation 1 is 1,000 to 40,000 MPa·%.

In one embodiment of the present invention, the soft layer may be formed by coating and curing a composition for forming a soft layer including a urethane acrylate oligomer, a photoinitiator and a solvent.

The urethane acrylate oligomer may be prepared by urethane reaction of an isocyanate compound having two or more isocyanate groups in a molecule with an acrylate compound having at least one hydroxyl group in a molecule.

Examples of the isocyanate compound specifically include 4,4'-dicyclohexyl diisocyanate, hexamethylene diisocyanate, 1,4-diisocyanatobutane, 1,6-diisocyanatohexane, 1,8-diisocyanatooctane, 1,12-diisocyanatododecane, 1,5-diisocyanato-2-methylpentane, trimethyl-1, 6-diisocyanatohexane, 1,3-bis(isocyanatomethyl) cyclohexane, trans-1,4-cyclohexene diisocyanate, 4,4'-methylenebis(cyclohexyl isocyanate), isophorone diisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylenebis(2,6-dimethylphenyl isocyanate), 4,4'-oxybis(phenyl isocyanate), trifunctional isocyanate derived from hexamethylene diisocyanate, trimethane propanol adduct toluene diisocyanate and the like. They can be used alone or in combination of two or more.

Examples of the acrylate compound having a hydroxyl group specifically include 2-hydroxyethyl acrylate, 2-hydroxyisopropyl acrylate, 4-hydroxybutyl acrylate, caprolactone ring-opening hydroxy acrylate, a mixture of pentaerythritol tri/tetraacrylate, a mixture of dipentaerythritol penta/hexaacrylate. They can be used alone or in combination of two or more.

The urethane acrylate oligomer may be, for example, a bifunctional urethane acrylate oligomer. Commercially available products of the bifunctional urethane acrylate oligomer include CN9002, CN910A70, CN9167, CN9170A86, CN9200, CN963B80, CN964A85, CN965, CN966H90, CN9761, CN9761A75, CN981, CN991, CN996 (Sartomer Arkema), UF8001G, UF8002G, UF8003G, DAUA-167 (available from KYOEISA Chemical), SC2404, SC2565, PU-2560, UA-5210 (available from Miwon Co., Ltd) and 122P, 122P(D) 232P (available from Shin Nakamura Chemical), etc. They can be used alone or in combination of two or more.

The urethane acrylate oligomer may be contained in an amount of 1 to 90% by weight, preferably 5 to 85% by weight, based on 100% by weight of the total composition for forming a soft layer. If the content is less than 1% by weight, sufficient impact resistance cannot be exhibited. If the content exceeds 90% by weight, the formation of a uniform cured coating film may be difficult due to high viscosity.

The photoinitiator can be used without limitation as long as it is used in the art. The photoinitiator can be classified into a Type I photoinitiator in which radicals are generated by decomposition of molecules due to a difference in chemical structure or molecular binding energy, and a Type II (hydrogen abstraction type) photoinitiator in which tertiary amines are coexisted. Specific examples of the Type I photoinitiator include acetophenones such as 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl) ketone, 1-hydroxycyclohexyl phenyl ketone and the like, benzoins such as benzoin, benzoin methyl ether, benzoin ethyl ether, benzyl dimethyl ketal, and the like, acylphosphine oxides, titanocene compounds, and the like. Specific examples of the Type II photoinitiator include benzophenones such as benzophenone, benzoylbenzoic acid, benzoylbenzoic acid methyl ether, 4-phenylbenzophenone, hydroxybenzophenone, 4-benzoyl-4'-methyldiphenyl sulfide, 3,3'-methyl-4-methoxybenzophenone, thioxanthones such as thioxanthone, 2-chlorothioxanthone, 2-methylthioxanthone, 2,4-dimethylthioxanthone, isopropylthioxanthone, and the like. They can be used, alone or in combination of two or more. In addition, the Type I photoinitiator and the Type II photoinitiator may be used alone or in combination.

The photoinitiator may be contained in an amount of 0.1 to 10% by weight based on 100% by weight, of the total composition for forming a soft layer. If the content is less than 0.1% by weight, the curing may not proceed sufficiently and thus the mechanical properties and adhesive force of the finally obtained coating film may not be implemented. If the content exceeds 10% by weight, the curing shrinkage may generate defects in the adhesive force, cracks or curls.

The solvent can be used without limitation as long as it is used in the art. Specific examples of the solvent include alcohols (such as methanol, ethanol, isopropanol, butanol and the like), cellosolves (such as methyl cellosolve, ethyl cellosolve and the like), ketones (such as methyl ethyl ketone, methyl butyl ketone, methyl isobutyl ketone, diethyl ketone, dipropyl ketone, cyclohexanone and the like), hexanes (such as hexane, heptane, octane and the like), benzenes (such as benzene, toluene, xylene and the like) and the like. They can be used alone or in combination of two or more.

The solvent may be contained in an amount of 10 to 70% by weight based on 100% by weight of the total composition for forming a soft layer. If the content is less than 10% by weight, the workability decreases due to high viscosity. I f the content exceeds 70% by weight, there are disadvantages in that it is difficult to adjust the thickness of the coating film, and drying unevenness occurs, resulting in appearance defects.

In addition to the above-mentioned components, the composition for forming a soft layer may further include components commonly used in the art such as leveling agents, heat stabilizers, antioxidants, UV absorbers, surfactants, lubricants, anti fouling agents and the like.

The leveling agent may be used to provide smoothness and a coating property of a coating film when coating the composition for forming a soft layer. As the leveling agent, silicon-type, fluorine-type and acryl polymer-type leveling agents which are commercially available may be used. For example, BYK-323, BYK-331, BYK-333, BYK-337, BYK-373, BYK-375, BYK-377, BYK-378, BYK-3570 (available from BYK Chemie), TEGO Glide 410, TEGO Glide 411, TEGO Glide 415, TEGO Glide 420, TEGO Glide 432, TEGO Glide 435, TEGO Glide 440, TEGO Glide 450, TEGO Glide 455, TEGO Rad 2100, TEGO Rad 2200N, TEGO Rad 2250, TEGO Rad 2300, TEGO Rad 2500 (available from Degussa), FC-4430, FC-4432 (available from 3M), and the like may be used. The leveling agent may be contained in an amount ranging from 0.1 to 3% by weight based on 100% by weight of the total composition for forming a soft layer.

The composition for forming a soft layer may be coated (coating process) onto on the retardation coating layer by appropriately using a known method such as die coater, air knife, reverse roll, spray, blade, casting, gravure, micro gravure, spin coating, and the like.

After coating the composition for forming a soft layer onto the retardation coating layer, a drying process may be carried out by vaporizing volatiles at a temperature of 30 to 150° C. for 10 seconds to 1 hour, more specifically for 30 seconds to 30 minutes, followed by curing by irradiation with UV rays. The irradiation amount of the UV rays may specifically be about 0.01 to 10 J/cm$^2$, more specifically 0.1 to 2 J/cm$^2$.

Herein, the thickness of the formed coating layer may be 1 to 20 μm, preferably 3 to 15 μm. When the thickness of the coating layer is within the above range, an excellent bending resistance-improving effect can be obtained.

In one embodiment of the present invention, the soft layer may be formed by laminating the substrate film having an amended toughness defined by Equation 1 of 1,000 to 40,000 MPa·% on the second retardation coating layer.

As the substrate film, the polymer film described as the substrate for the polarizing coating layer may be used without limitation as long as the condition that the amended toughness is 1,000 to 40,000 MPa·% is met.

The substrate film may be laminated onto the second retardation coating layer using the substrate film instead of a transfer film when forming the second retardation coating layer.

The thickness of the substrate film may be 10 to 80 μm, preferably 20 to 60 μm.

The polarizing plate 100 according to o n e embodiment of the present invention may further include a polarizing coating protective layer (not shown) between the polarizing coating layer 120 and the first adhesive layer 125.

The polarizing coating protective layer may be formed by the above-described pressure sensitive adhesive or adhesive.

The thickness of the polarizing coating protective layer may be 0.5 to 5 μm, preferably 0.7 to 3 μm. If the thickness is less than 0.5 μm, the protective effect of the polarizing coating layer is insufficient and thus it may be difficult to inhibit the deterioration of the optical performance. If the thickness exceeds 5 μm, the bending property may be adversely affected.

The polarizing plate according to the present invention is applicable not only to a general liquid crystal display device, but also to various image display devices such as an electroluminescent display device, a plasma display device and the like. Accordingly, one embodiment, of the present invention relates to an image display device including the polarizing plate, in particular, to a flexible display.

Hereinafter, the present invention will be described in more detail by way of Examples, Comparative Examples and Experimental Examples. However, these Examples, Comparative Examples and Experimental Examples are given for illustrative purposes only, and it is apparent to those skilled in the art that the scope of the invention is not intended to be limited by these Examples.

PREPARATION EXAMPLE 1

Preparation of Composition for Forming Polarizing Coating Layer 100 parts by weight of a compound represented by the following formula as a polymerizable liquid crystal compound, 2 parts by weight of an azo dye (NKX2029; Hayashibara Seibutsu Kagaku Kenkyujo), 6 parts by weight of 2-dimethylamino-2-benzyl-1-(4-morpholinophenyl)butan-1-one as a polymerization initiator (Irgacure 369; BASF Japan Ltd.), 2 parts by weight of isopropylthioxanthone as a photosensitizer (Nippon Siber Hegner), 1.2 parts by weight of polyacrylate compound as a leveling agent (BYK-361N; BYK-Chemie) and 250 parts by weight of cyclopentanone as a solvent were mixed, and the thus-obtained mixture was stirred at 80° C. for 1 hour to prepare a composition for forming a polarizing coating layer.

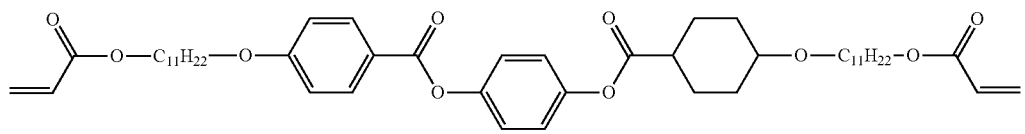

PREPARATION EXAMPLE 2

Preparation of Composition for Forming Retardation Coating Layer

A composition for forming a retardation coating layer was prepared in the same manner as in Preparation Example 1, except that the azo dye was not included.

PREPARATION EXAMPLE 3

Preparation of Composition for Forming a Soft Layer

A composition for forming a soft layer was prepared by mixing each component in the composition shown in Table 1 below (unit: parts by weight).

TABLE 1

| | Preparation Example 3-1 | Preparation Example 3-2 | Preparation Example 3-3 | Preparation Example 3-4 | Preparation Example 3-5 |
|---|---|---|---|---|---|
| 122P | 5 | 10 | 20 | 40 | 0 |
| SC2565 | 35 | 30 | 20 | 0 | 40 |
| Photoinitiator | 2.5 | 2.5 | 2.5 | 2.5 | 2.5 |
| Leveling Agent | 0.5 | 0.5 | 0.5 | 0.5 | 0.5 |
| Solvent | 60 | 60 | 60 | 60 | 60 |

122P: Bifunctional urethane acrylate oligomer (Shin Nakamura Chemical)
SC2565: Bifunctional urethane acrylate oligomer (Miwon Co., Ltd)
Photoinitiator: Irg-184 (BASF Corporation)
Leveling Agent: BYK-3570 (BYK-Chemie)
Solvent: Methyl ethyl ketone (MEK)

EXAMPLES AND COMPARATIVE EXAMPLES

Preparation of Polarizing Plates

Example 1

(1) Formation of Polarizing Coating Layer

ROP-108 EXP115 (Rolic) was coated onto a triacetylcellulose substrate having a thickness of 40 μm in a thickness of 1 μm, dried, and then exposed to light (250 mJ/cm$^2$) to form an alignment film layer. Thereafter, the composition for forming a polarizing coating layer of Preparation Example 1 was coated thereon, dried, and then cured by irradiation of UV light of 500 mJ/cm$^2$ for 1 minute to form a polarizing coating layer having a thickness of 2 μm.

(2) Formation of First Retardation Coating Layer (λ/4 Layer)

ROP-108 EXP115 (Rolic) was coated onto a COP(ZF-14) transfer film (thickness of 23 μm) in a thickness of 1 μm, dried, and then exposed to light (250 mJ/cm$^2$) to form an alignment film layer. Thereafter, the composition for forming a retardation coating layer of Preparation Example 2 was coated thereon by a die coating method, dried, and then cured by irradiation of UV light of 1000 mJ/cm$^2$ for 1 minute to form a first retardation coating layer having a thickness of 2 μm.

(3) Formation of Second Retardation Coating Layer (Positive C Layer)

ROP-108 EXP115 (Rolic) was coated onto a COP(ZF-14) transfer film (thickness of 23 μm) in a thickness of 1 μm, dried, and then exposed to light (250 mJ/cm$^2$) to form an alignment film layer. Thereafter, the composition for forming a retardation coating layer of Preparation Example 2 was coated thereon by a die coating method, dried, and then cured by irradiation of UV light of 1000 mJ/cm$^2$ for 1 minute to form a second retardation coating layer having a thickness of 1 μm.

(4) Preparation of Polarizing Plate

An acryl-based pressure sensitive adhesive film having a thickness of 5 μm (separator film adhesive non-carrier film manufactured by Lintec) was adhered to the polarizing coating layer, and the first retardation coating layer formed on the transfer film was laminated. Thereafter, the transfer film was peeled off, and then the acryl-based pressure sensitive adhesive film (separator film adhesive non-carrier film manufactured by Lintec) having a thickness of 5 μm was adhered, and the second retardation coating layer formed on the transfer film was laminated. Subsequently, the transfer film was peel off, and then the composition for forming a soft layer of Preparation Example 3-1 was coated onto the second retardation coating layer, dried and then exposed to light (1.5 J/cm$^2$) to form a polarizing plate. The amended toughness of the formed soft layer was 1,200 MPa·%.

Example 2-3

A polarizing plate was prepared in the same manner as Example 1, except that the compositions for forming a soft layer of Preparation Examples 3-2 and 3-3 were each used, instead of the composition for forming a soft layer of Preparation Example 3-1. The amended toughness of the formed soft layers was 1,600 and 2,400 MPa·%, respectively.

Example 4

(1) Formation of Polarizing Coating Layer

ROP-108 EXP115 (Rolic) was coated onto a triacetylcellulose substrate (thickness of 40 μm) in a thickness of 1 μm, dried, and then exposed to light (250 mJ/cm$^2$) to form an alignment film layer. Thereafter, the composition for forming a polarizing coating layer of Preparation Example 1 was coated thereon, dried, and then cured by irradiation of UV light of 500 mJ/cm$^2$ for 1 minute to form a polarizing coating layer having a thickness of 2 μm.

(2) Formation of First Retardation Coating Layer

ROP-108 EXP115 (Rolic) was coated onto a COP (ZF-14) transfer film (thickness of 23 μm) in a thickness of 1 μm, dried, and then exposed to light (250 mJ/cm$^2$) to form an alignment film layer. Thereafter, the composition for forming a retardation coating layer of Preparation Example 2 was coated thereon by a die coating method, dried, and then cured by irradiation of UV light of 1000 mJ/cm² for 1 minute to form a first retardation coating layer having a thickness of 2 μm.

(3) Formation of Second Retardation Coating Film

ROP-108 EXP115 (Rolic) was coated onto a triacetylcellulose(TAC) substrate film (thickness of 25 μm) having an amended toughness of 4,500 MPa·% in a thickness of 1 μm, dried, and then exposed to light (250 mJ/cm²) to form an alignment film layer. Thereafter, the composition for forming a retardation coating layer of Preparation Example 2 was coated thereon by a die coating method, dried, and then cured by irradiation of UV light of 1000 mJ/cm² for 1 minute to form a second retardation coating film on which the second retardation coating layer having a thickness of 1 μm was formed.

(4) Preparation of Polarizing Plate

An acryl-based pressure sensitive adhesive film having a thickness of 5 μm (separator film adhesive non-carrier film manufactured by Lintec) was adhered to the polarizing coating layer, and the first retardation coating layer formed on the transfer film was laminated. Thereafter, the transfer film was peeled off, and then the acryl-based pressure sensitive adhesive film (separator film adhesive non-carrier film manufactured by Lintec) having a thickness of 5 μm was adhered, and the second retardation coating film was laminated to form a polarizing plate.

Example 5

A polarizing plate was prepared in the same manner as in Example 4, except that a PET substrate film having an amended toughness of 40,000 MPa·% and a thickness of 25 μm was used, instead of the triacetylcellulose substrate film having an amended toughness of 4,500 MPa·% and a thickness of 25 μm in the preparation of the second retardation coating film.

Comparative Example 1

A polarizing plate was prepared in the same manner as in Example 1, except that the steps of coating the composition for forming a soft layer of Preparation Example 3-1 on the second retardation coating layer, drying and then exposing it to light were omitted.

Comparative Example 2-3

A polarizing plate was prepared in the same manner as in Example 1, except that the compositions for forming a soft layer of Preparation Examples 3-4 and 3-5 were each used, instead of the composition for forming a soft layer of Preparation Example 3-1. The amended toughness of the formed soft layers was 250 and 720 MPa·%, respectively.

Experimental Example 1

Evaluation of Bending Resistance

The bending resistance of the polarizing plates prepared in the Examples and Comparative Examples was measured by the following method, and the results are shown in Table 2 below.

The polarizing plate was cut into a size of 10 mm×80 mm and adhered to a bending test apparatus for performing a semicircular motion such that the interval between the plates was 5 mm (2.5 R), and then the operations were repeated 100,000 times. The appearance was confirmed for every 10,000 units, and the point at which the polarizing plate was damaged (cracked) was recorded.

TABLE 2

| | Amended toughness of soft layers (MPa · %) | Bending Resistance |
|---|---|---|
| Example 1 | 1,200 | 100,000 OK |
| Example 2 | 1,600 | 100,000 OK |
| Example 3 | 2,400 | 100,000 OK |
| Example 4 | 4,500 | 100,000 OK |
| Example 5 | 40,000 | 100,000 OK |
| Comparative Example 1 | — | 30,000 NG |
| Comparative Example 2 | 250 | 30,000 NG |
| Comparative Example 3 | 720 | 40,000 NG |

As shown in Table 1, the polarizing plates of Examples 1 to 5 according to the present invention which include the soft layer having an amended toughness of 1,000 to 40,000 MPa·% exhibited excellent bending resistance to such an extent that cracking did not occur even when the bending tests were repeated 100,000 times. Meanwhile, for the polarizing plate of Comparative Example 1 which did not include the soft layer, and the polarizing plates of Comparative Examples 2 and 3 whose amended toughness was less than 1,000 MPa·%, cracking occurred when the bending tests were repeated 30,000 or 40,000 times.

Although specific parts o f the present invention have been described in detail, it will be apparent to those skilled in the art that these specific techniques are merely a preferred embodiment and that the scope of the present invention is not limited thereto. In addition, those skilled in the art will appreciate that various applications and modifications are possible, without departing from the scope and spirit of the invention based on the description above.

Therefore, the substantial scope of the present invention will be defined by the accompanying claims and their equivalents.

The invention claimed is:

1. A polarizing plate comprising a substrate, a polarizing coating layer formed on one side of the substrate, a first adhesive layer formed on the layer formed on the first adhesive layer, a second adhesive layer formed on the first retardation coating layer, a second retardation coating layer formed on the second adhesive layer and a soft layer formed on the second retardation coating layer, wherein the soft layer has an amended toughness defined by the following Equation 1 of 1,000 to 40,000 MPa·%:

$$\text{Amended toughness} = \text{Maximum stress} \times \text{maximum strain} \quad \text{[Equation 1]}$$

wherein,
the maximum stress represents the stress at the fracture point in a stress-strain curve, and
the maximum strain represents the strain at the fracture point in the stress-strain curve.

2. The polarizing plate of claim 1, wherein the first retardation coating layer is a λ/4 layer, and the second retardation coating layer is a positive C layer.

3. An image display device comprising the polarizing plate of claim 2.

4. The polarizing plate of claim 1, wherein the first retardation coating layer is a positive C layer, and the second retardation coating layer is a λ/4 layer.

5. An image display device comprising the polarizing plate of claim 4.

6. The polarizing plate of claim 1, wherein the first adhesive layer or the second adhesive layer is a pressure sensitive adhesive layer formed by a pressure sensitive adhesive or an adhesive layer formed by an adhesive.

7. An image display device comprising the polarizing plate of claim 6.

8. The polarizing plate of claim 1, wherein the soft layer is a coating layer.

9. An image display device comprising the polarizing plate of claim 8.

10. The polarizing plate of claim 8, wherein the soft layer is formed from a composition for forming a soft layer including a urethane acrylate oligomer, a photoinitiator and a solvent.

11. An image display device comprising the polarizing plate of claim 10.

12. The polarizing plate of claim 1, wherein the soft layer is a substrate film.

13. An image display device comprising the polarizing plate of claim 12.

14. The polarizing plate of claim 1, further including a polarizing coating protective layer between the polarizing coating layer and the first adhesive layer.

15. An image display device comprising the polarizing plate of claim 14.

16. An image display device comprising the polarizing plate of claim 1.

17. A flexible display comprising the polarizing plate of claim 1.

* * * * *